Feb. 13, 1923.
H. TROUTS
DIRIGIBLE HEADLIGHT
Filed July 13, 1922
1,445,114
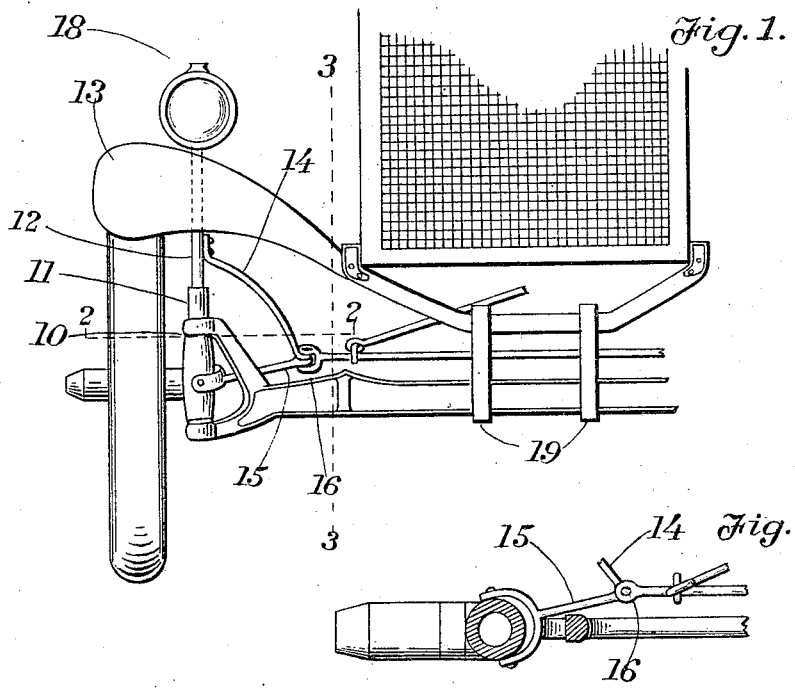
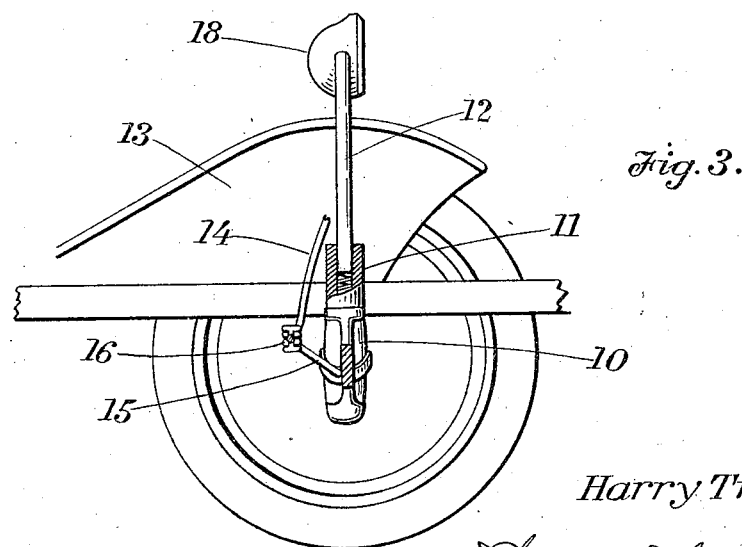
Inventor
Harry Trouts
By
Attorney Patented Feb. 13, 1923.

1,445,114

UNITED STATES PATENT OFFICE.

HARRY TROUTS, OF UPPER BLACK EDDY, PENNSYLVANIA.

DIRIGIBLE HEADLIGHT.

Application filed July 13, 1922. Serial No. 574,788.

*To all whom it may concern:*

Be it known that I, HARRY TROUTS, a citizen of the United States, residing at Upper Black Eddy, in the county of Bucks, State of Pennsylvania, have invented certain new and useful Improvements in Dirigible Headlights; and I do hereby declare the following to be a full, clear, and exact description of the invention, such as will enable others skilled in the art to which it appertains to make and use the same.

This invention relates to new and useful improvements in headlights, and particularly to automobile headlights.

One object of the present invention is to provide a novel and improved structure of this character whereby the headlight lamps will be automatically steered with the front wheels of the automobile.

Another object is to provide a novel and improved device of this character which is especially adapted for use in connection with Ford automobiles, although it may be readily applied to automobiles of other makes.

Other objects and advantages will be apparent from the following description when taken in connection with the accompanying drawing.

In the drawing:

Figure 1 is a front elevation of an automobile equipped with my improved dirigible headlights.

Figure 2 is a horizontal sectional view taken on the line 2—2 of Figure 1, above the axle of the automobile, to show the connection between the lamp post and the steering mechanism.

Figure 3 is a vertical sectional view taken on the line 3—3 of Figure 1, just inwardly of the front wheel of the automobile.

Referring particularly to the accompanying drawing, 10 represents the vertical pivot bolt of the steering knuckle of the automobile. Secured to the upper end of the pivot bolt 10, and extending vertically thereabove, is a tubular member 11, in which is rotatably supported the lower end of the oscillating lamp post 12. This post extends vertically through and is rotatable in the mud guard 13, as shown in the drawing. Secured to and extending downwardly and rearwardly from the post 12, above the upper end of the tube 11, is an arm 14, the lower end of which is connected to the adjacent end of the steering rod 15, by the bolt 16 which joins the thrust rod 17 to the rod 15. On the upper end of the post, above the mud guard, is mounted the headlight lamp 18 which is arranged to turn with the post. Thus when the front wheels of the automobile are turned in either direction the headlight will be turned in the same direction thus causing the light from the lamp to shine on the road around the curve, instead of across, and on the outside thereof.

Connected to the axle and to the front spring are the retaining frames 19 which permit the spring to move downwardly but limit its upward movement thus preventing the upward rebounding of the automobile from injuring the lamps through the mud guards.

What is claimed is:

1. The combination with the steering rod and vertical pivot of the front steering knuckle of an automobile, of a vertical tubular member secured to the upper end of the said pivot, a vertical lamp post rotatably seated in the tubular member and extending upwardly through the mud guard of the automobile, an arm rigidly carried by the post and extending downwardly and rearwardly therefrom, said arm being connected to the adjacent end of the steering rod, and means for limiting the upward movement of the front spring of the automobile to prevent the mud guard from moving up too high and injuring the lamp on the post.

2. The combination with the steering rod and vertical pivot of the front steering knuckle of an automobile, of a vertical tubular member secured to the upper end of the said pivot, a vertical lamp post rotatably seated in the tubular member and extending upwardly through the mud guard of the automobile, an arm rigidly carried by the post and extending downwardly and rearwardly therefrom, said arm being connected to the adjacent end of the steering rod, and straps encircling the front axle of the automobile and the member to which the mud guard is attached, to limit the upward movement of the mud guard to prevent injury of the lamp thereby.

In testimony whereof, I have affixed my signature, in the presence of two witnesses.

HARRY TROUTS.

Witnesses:
E. A. STROM,
E. W. BLOOM.